Sept. 22, 1936.      F. M. CASE            2,055,451
                     FISHING REEL
              Filed July 21, 1932       2 Sheets-Sheet 1

INVENTOR
FRANCIS M. CASE
BY
ATTORNEYS

Sept. 22, 1936.  F. M. CASE  2,055,451
FISHING REEL
Filed July 21, 1932  2 Sheets-Sheet 2
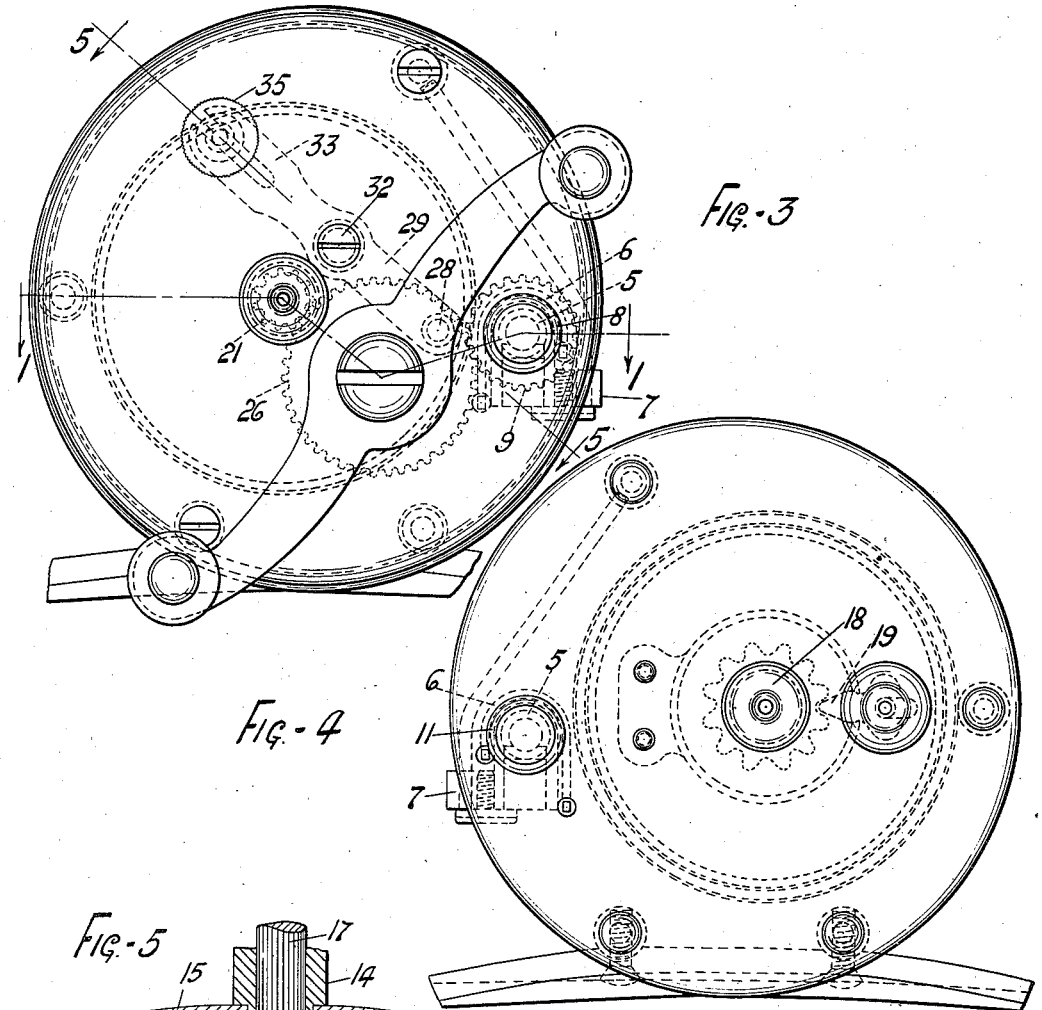
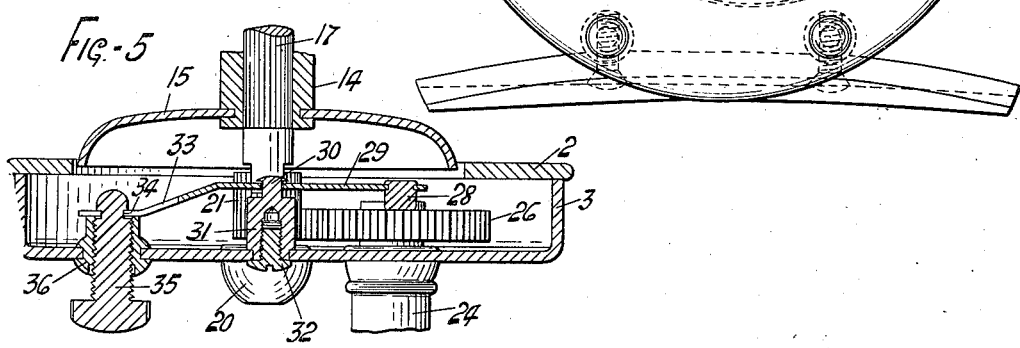
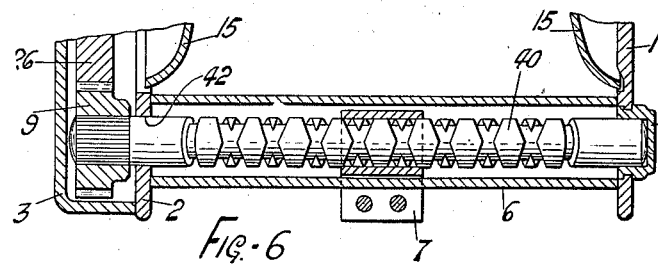
INVENTOR
FRANCIS M. CASE
BY Ely & Barrow
ATTORNEYS Patented Sept. 22, 1936

2,055,451

UNITED STATES PATENT OFFICE 2,055,451

FISHING REEL

Francis M. Case, Cleveland, Ohio, assignor to The Enterprise Manufacturing Company, Akron, Ohio, a corporation of Ohio Application July 21, 1932, Serial No. 623,763

9 Claims. (Cl. 242—84.5)

The present invention relates to the construction of fishing reels and has for its primary object features whereby an excellent and satisfactory reel structure may be made and assembled economically and effectively. This application is a continuation in part of my earlier application, Serial No. 568,132, filed October 10, 1931.

One of the objects of the invention is to provide a reel structure in which the usual precautions to insure accuracy of fit and adjustment are not necessary owing to the manner in which the reel is constructed. It is also an object of the invention to provide a new and useful form of anti-backlash mechanism which is superior in operation to other or usual forms of anti-backlash devices and is simple and easy to manufacture and assemble.

These and other objects will be apparent from the description and drawings which constitute the disclosure of the best known form of the invention, but it is not intended that the invention shall be limited to exact conformity with specific details as shown and described, for changes and modifications may be made within the full scope and purview of the invention.

In the drawings:

Figure 3 is an end view of the reel, looking at the front or crank end thereof;

Figure 4 is a view looking at the opposite end of the reel;

Figure 5 is a section taken through the anti-backlash mechanism on the line 5—5 of Figure 3; and Figure 6 is a view taken along the level wind shaft showing a modified form of shaft bearing.

Figure 1:
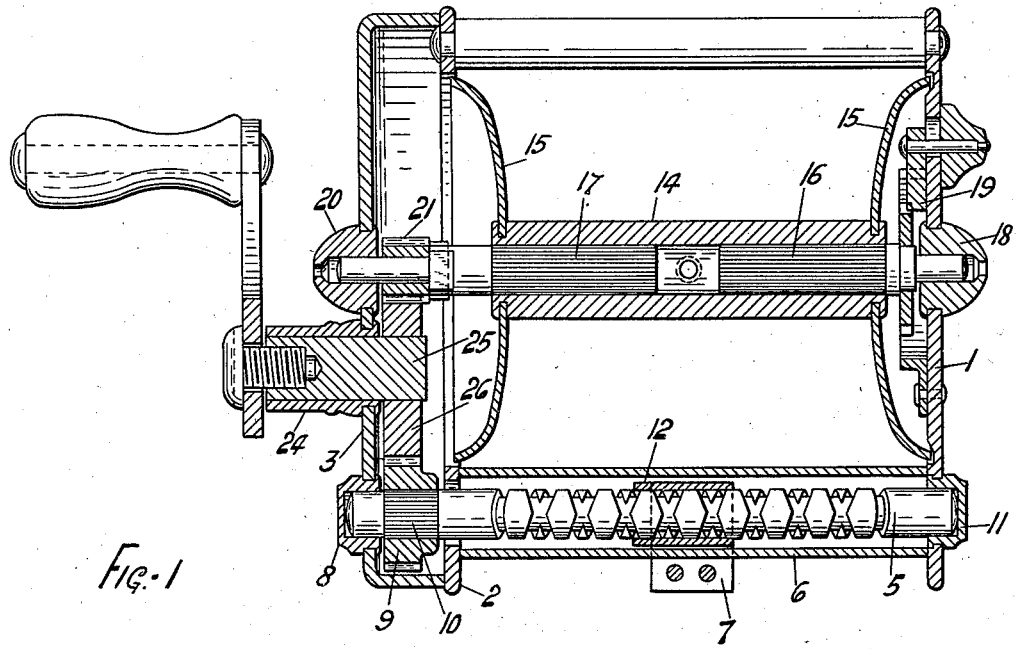
Figure 1 is a longitudinal section of the improved reel construction taken through the axis of the reel and the level winding mechanism, on the line 1—1 of Figure 3.
Figure 2:
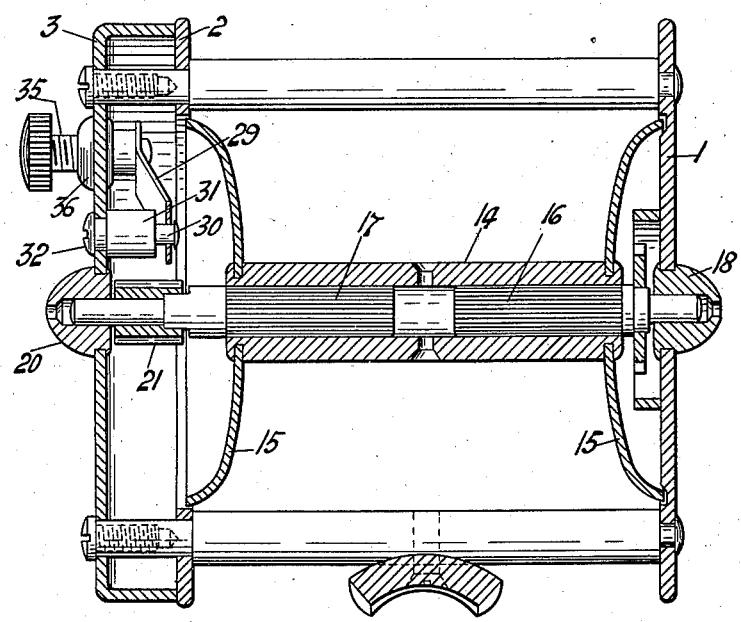
Figure 2 is a similar section taken in a plane at right angles to Figure 1.

The reel comprises the rear plate 1 and the front plate 2 which is of annular or ring form to receive one of the spool flanges. The cap or outer cover plate is of the flanged type and is indicated at 3. The whole reel structure is secured in position by the usual pillars as is well known in the art. Located at one side of the reel is the level wind mechanism comprising the double screw-threaded shaft 5 surrounded by the casing 6 and operating the reciprocating line guide carriage 7. The shaft 5 projects within the casing 3, the end of the shaft being received in a cap 8 set within the casing so that the shaft is confined in one direction but is removable when the cover is removed. On the end of the shaft within the casing is located the pinion 9. The portion of the shaft which is to receive the pinion is provided with a plurality of longitudinal knurls or corrugations, indicated at 10, and the pinion is driven into its proper place on the shaft. This method of securing the pinion in its proper position on the shaft also permits of a ready means of locating the pinion properly so that inaccuracies in the proportions or details of the remainder of the reel may be compensated for in the assembly of the reel. This makes for economy in manufacture. The opposite end of the shaft 5 is received within a cap 11 secured in the back plate, which limits the movement of the shaft in the opposite direction. In mounting the shaft in the manner described, the rim of the front plate may be cut out to provide an enlarged opening around the shaft where it passes through the front plate. This provides a place to receive an extension 12 from the level wind carriage, if it be desired to give a longer range of carriage movement.

The spool is composed of the hub or barrel 14 and the spool flanges 15. It is provided with the two short sectional shafts 16 and 17, each of which is longitudinally grooved or corrugated and is entered from one end of the barrel and driven into its proper position, thereby assembling the spool and shaft together economically and efficiently. This also permits the overall length of the shaft and its position in regard to the spool to be regulated in the assembly of the spool to inaccuracies in manufacture of the cage or reel structure. The shaft section 16 is received in a bushing 18 in the rear plate and is provided with the usual click mechanism, indicated at 19. The shaft section 17 extends into and is received in a bushing 20 in the cover plate 3 and carries the spool pinion 21 which may either be a separate part or integral with the section 17.

On the cover plate is located the bushing 24 for the crank shaft 25 which carries at its inner end the gear 26 which meshes with pinions 9 and 21. With the gear 26 cooperates the anti-backlash mechanism to be described.

The inner face of the gear, or that face toward the reel, has a flat surface and against this surface bears a shoe 28 which is mounted on the end of a flat spring arm 29 loosely received at a midway point over a reduced bearing pin or fulcrum 30 formed on the end of a stud 31 removably secured to the cover plate by a screw 32. The other end of the spring is bent toward the cover plate and is provided with an elongated fork 33 which is slipped into a groove 34 on the end of an adjustable pin 35 movable in a bushing 36 on the cover plate. The pin 35 and bushing are screw-threaded so that as the pin is adjusted in the cover plate the pressure exerted by the shoe upon the gear may be regulated accurately and easily. Aside from considerations of cheapness and economy, the anti-backlash mechanism presents many features of superiority over similar devices.

It is customary to apply anti-backlash devices to a spool flange. By associating it with the gear it is possible to obtain a very fine adjustment as the gear rotates at less surface speed than the spool. The gear also presents a comparatively even running surface to which the brake may be applied, a result not obtainable where the surface of the spool flange may be subject to wabbling or uneven travel. The surface of the gear is smooth and regular and therefore is a superior location for the mechanism and, in addition, the spring arm readily takes up and absorbs any fine irregularities in operation. In assembling, the jaws of the forked spring arm may be somewhat closer together than the thickness of the pin at the groove so that the pinching action of the jaws may be availed of to retard rotation of the pin in its seat. This construction also prevents withdrawal of the pin 35. The whole mechanism is simple, inexpensive and yet possesses superiority in operation which gives it many points of advantage over previous devices.

Except as indicated above, the reel is of standard or usual construction. The various features of the invention are capable of conjoint use and yet may be used independently. There is no intention that the protection obtained herein shall be limited to exact conformity with the details as set forth and described.

In the modification shown in Figure 6, the double screw-threaded shaft is indicated at 40 and is located at one end in a cap bearing 41 on the rear end plate 1 by which it is prevented from displacement in one direction. The opposite end of the shaft is in close relation to the interior of the cover 3 so that displacement in the opposite direction is prevented. The bearing for the front of the shaft 40 is provided in the front end plate 2 as at 42. In this form the elongated carriage is not employed.

The principal objects of the invention have been to simplify and reduce the cost of manufacture of reels of the type described, but this has been accomplished without sacrificing the efficiency or operability of the reel structure.

What is claimed is:

1. A reel structure comprising a spool and a spool pinion, a driving gear in mesh with the pinion, a fulcrum on the reel, a spring arm pivotally mounted upon the fulcrum, a brake shoe on one end of the arm overlying the gear, the opposite end of the arm being forked, and a vertically adjustable pin on the reel and having a groove in which the forked arm is received.

2. A reel structure comprising a spool and a spool pinion, a driving gear in mesh with the pinion, a fulcrum on the reel, a spring arm mounted on the fulcrum, a brake shoe on one end of the arm overlying the gear, a vertically adjustable pin on the reel having engagement with the spring arm to move it toward and away from the gear, said spring arm comprising means for frictionally resisting movement of said pin.

3. A reel structure comprising a spool and spool pinion, a driving gear in mesh with the pinion, a fulcrum pin on the reel, a spring arm loosely received over the fulcrum pin, a brake shoe in one end of the arm overlying the gear, and a rotatably and vertically adjustable member at the other end of the spring arm, the arm gripping the member so as frictionally to retard its rotation.

4. A reel structure comprising a spool and spool pinion, a driving gear in mesh with the pinion, a pivoted lever on the reel, a brake shoe at one end of the lever overlying said driving gear, and a rotatably and vertically adjustable member at the opposite end of the lever, the lever having means to grip the member so as frictionally to resist its rotation.

5. A reel structure comprising a spool and spool pinion, a driving gear in mesh with the pinion, a pivoted lever on the reel, a brake shoe at one end of the lever overlying said driving gear, and a rotatably and vertically adjustable member at the opposite end of the lever, the lever having means to grip the member to retard its rotation and limit its vertical movement.

6. A reel structure comprising a spool and means to drive the spool comprising a spool pinion and a driving gear in mesh therewith, a spring arm fulcrumed at a midway point and bearing a brake shoe at one end engageable with said driving gear, and a rotatable actuator for the arm interconnected with the opposite end thereof.

7. A reel structure comprising a frame, a spool journaled therein, a level wind carriage movable longitudinally of the reel, a reversely threaded rotatable shaft to actuate the carriage, said shaft being of uniform diameter throughout, bearings for the shaft engageable with the outer surface thereof, and means contacting the ends of the shaft to prevent axial shifting thereof.

8. A reel structure comprising a frame, a spool journaled therein, a level wind carriage movable longitudinally of the reel, a reversely threaded rotatable shaft to actuate the carriage, said shaft being of uniform diameter throughout, bearings for the shaft engageable with the outer surface thereof, means contacting the ends of the shaft to prevent axial shifting thereof, and a pinion having a drive fit on the shaft.

9. A reel structure comprising a spool and spool pinion, a driving gear in mesh with the pinion and having a plane surface, a spring arm mounted on the reel and carrying a brake shoe that overlies said gear, and a rotatable adjusting member for operating the spring arm to apply and release the brake, said spring arm having means to grip the adjusting member to retard its rotation and limit its adjusting movement.

FRANCIS M. CASE.